United States Patent
Sauer et al.

(10) Patent No.: US 8,267,422 B2
(45) Date of Patent: Sep. 18, 2012

(54) AIR BAG MODULE FOR A VEHICLE OCCUPANT RESTRAINT SYSTEM

(75) Inventors: Frank Sauer, Niedernberg (DE); Steffen Weigand, Aschaffenburg (DE)

(73) Assignee: Takata AG, Aschaffenburg (DE)

( * ) Notice: Subject to any disclaimer, the term of this patent is extended or adjusted under 35 U.S.C. 154(b) by 0 days.

(21) Appl. No.: 13/102,982

(22) Filed: May 6, 2011

(65) Prior Publication Data
US 2011/0210534 A1    Sep. 1, 2011

Related U.S. Application Data

(63) Continuation of application No. PCT/EP2010/058468, filed on Jun. 16, 2010.

(30) Foreign Application Priority Data

Jun. 19, 2009 (DE) .................. 10 2009 030 151

(51) Int. Cl.
*B60R 21/215* (2011.01)
*B60R 21/2165* (2011.01)

(52) U.S. Cl. ..................................... 280/728.3; 280/731

(58) Field of Classification Search ............... 280/728.2, 280/728.3, 731, 732; 403/329, 280, DIG. 14; 24/23 W, 23 EE, 20 EE; 411/508, 913
See application file for complete search history.

(56) References Cited

U.S. PATENT DOCUMENTS

| | | | |
|---|---|---|---|
| 3,640,546 A | | 2/1972 | Brawn |
| 3,756,617 A | * | 9/1973 | Brown .......................... 280/732 |
| 5,062,663 A | * | 11/1991 | Satoh .......................... 280/728.3 |
| 5,183,288 A | * | 2/1993 | Inada et al. .................... 280/732 |
| 5,201,541 A | * | 4/1993 | Jones et al. .................... 280/731 |
| 5,411,288 A | | 5/1995 | Steffens, Jr. |
| 5,460,402 A | | 10/1995 | Rhodes, Jr. |
| 5,741,024 A | * | 4/1998 | Enders ......................... 280/728.3 |
| 5,762,361 A | * | 6/1998 | Herrmann et al. ........... 280/728.2 |
| 5,829,777 A | | 11/1998 | Sakurai et al. |
| 6,158,764 A | | 12/2000 | Preisler et al. |

(Continued)

FOREIGN PATENT DOCUMENTS

DE     2 045 245     5/1971

(Continued)

OTHER PUBLICATIONS

Definition: Interface, Merriam-Webster's Online Dictionary, available at, http://www.merriam-webster.com/dictionary/interface (last visited Jul. 30, 2011).*

(Continued)

*Primary Examiner* — Joseph Rocca
(74) *Attorney, Agent, or Firm* — Foley & Lardner LLP

(57) ABSTRACT

An airbag module for a vehicle occupant restraint system is provided. The airbag module comprises an airbag, a gas generator, a gas generator support, and a visible surface facing the vehicle interior in the installed state formed by different segments of the airbag module. At least two of the segments comprise optically and/or haptically different surfaces and are mechanically connected to each other by means of mechanical interfaces such that the mechanical connection between the segments is at least partially released when triggered by opening the interfaces so that an opening is formed in the visible surface through which the airbag can exit the airbag module. All segments contributing to the formation of the opening for the airbag by opening the interfaces when triggered are thereby directly fastened to the gas generator support.

17 Claims, 9 Drawing Sheets

U.S. PATENT DOCUMENTS

| | | | |
|---|---|---|---|
| 6,402,189 | B1 | 6/2002 | Gray et al. |
| 6,426,473 | B1 | 7/2002 | Derrick et al. |
| 6,435,542 | B2* | 8/2002 | Nakashima et al. ........ 280/728.3 |
| 6,443,484 | B2* | 9/2002 | Anglsperger .............. 280/728.3 |
| 6,546,659 | B1* | 4/2003 | Imai et al. ........................ 40/662 |
| 6,613,415 | B2* | 9/2003 | Iida et al. ...................... 428/139 |
| 7,261,314 | B2 | 8/2007 | Schneider et al. |
| 7,287,618 | B2* | 10/2007 | Okamoto et al. ............. 180/274 |
| 2002/0005631 | A1* | 1/2002 | Varcus et al. ............. 280/728.3 |
| 2002/0163172 | A1* | 11/2002 | Mochizuki et al. ........ 280/743.1 |
| 2003/0178819 | A1 | 9/2003 | Schneider et al. |
| 2003/0209889 | A1* | 11/2003 | Erwin et al. ............... 280/728.3 |
| 2005/0263988 | A1 | 12/2005 | Welford |
| 2005/0263989 | A1 | 12/2005 | Helmstetter |
| 2005/0275197 | A1 | 12/2005 | Kaifuki et al. |
| 2006/0000065 | A1 | 1/2006 | Takasawa et al. |
| 2006/0202449 | A1 | 9/2006 | Yokota et al. |
| 2007/0126216 | A1* | 6/2007 | Nakamura et al. ............ 280/731 |
| 2007/0158932 | A1* | 7/2007 | Taniyama et al. .......... 280/728.3 |
| 2008/0100040 | A1* | 5/2008 | DePottey et al. .......... 280/728.2 |
| 2010/0295271 | A1* | 11/2010 | Shimazaki et al. ........ 280/728.2 |

FOREIGN PATENT DOCUMENTS

| | | |
|---|---|---|
| DE | 299 18 483 U1 | 3/2000 |
| DE | 200 16 493 U1 | 12/2000 |
| DE | 101 64 210 A1 | 7/2003 |
| DE | 103 07 334 A1 | 9/2004 |
| DE | 11 2005 001 219 T5 | 7/2007 |
| DE | 10 2006 029 424 A1 | 1/2008 |
| EP | 1 602 534 A1 | 12/2005 |
| EP | 1 607 278 A1 | 12/2005 |
| EP | 1 611 812 A1 | 1/2006 |
| WO | WO-03/076230 A2 | 9/2003 |
| WO | WO-2009/022500 A1 | 2/2009 |
| WO | WO2009022500 A1 * | 2/2009 |

OTHER PUBLICATIONS

International Search Report in PCT/EP2010/058468 dated Dec. 22, 2010.

Color Photographs representing the airbag module used in the passenger car model Fiat 500 (model year 2007/2008), Automobile Manufacturer FIAT SPA, 7 pages.

Office Action in U.S. Appl. No. 13/212,906 dated Dec. 15, 2011.

* cited by examiner

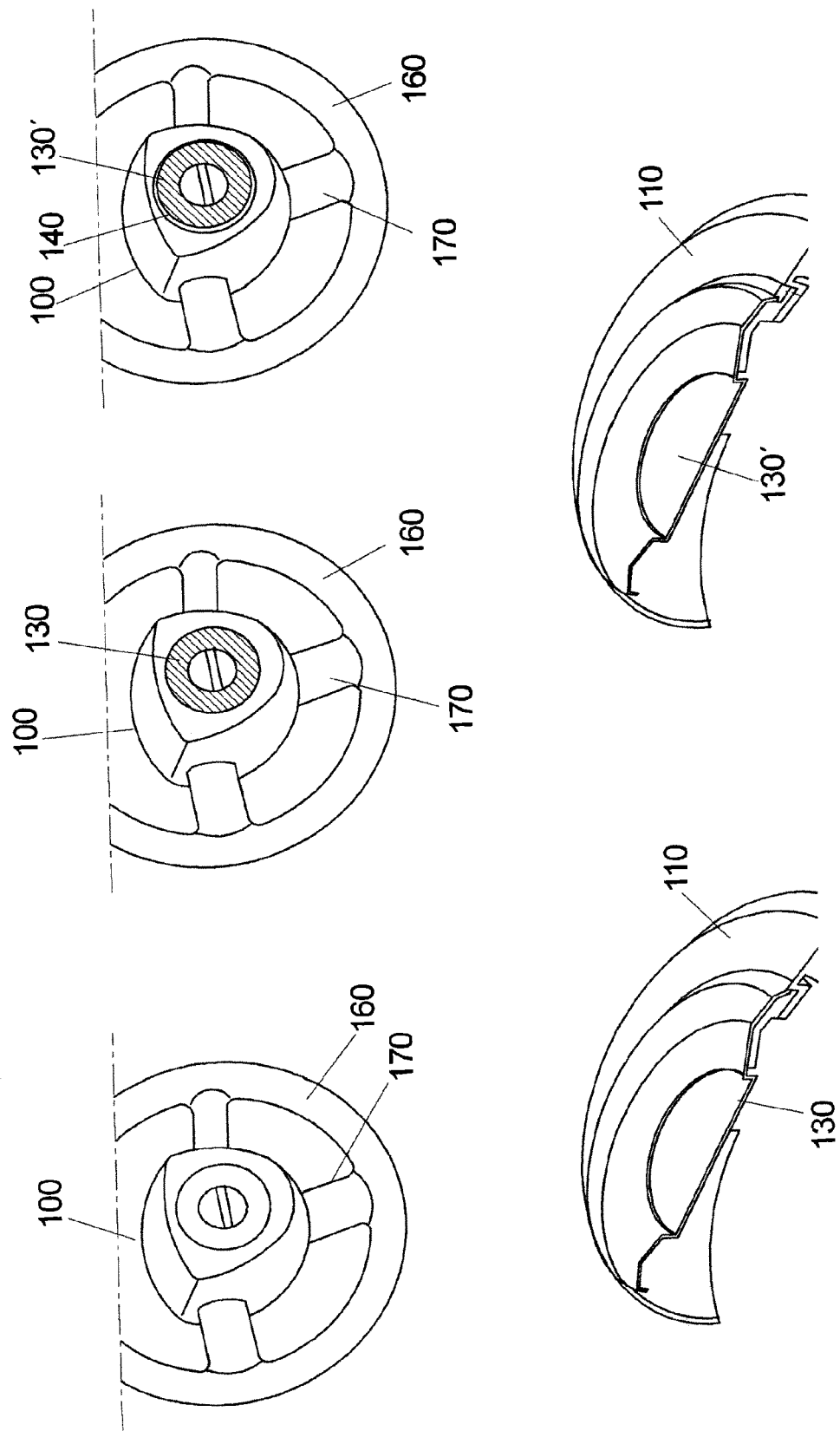

AIR BAG MODULE FOR A VEHICLE OCCUPANT RESTRAINT SYSTEM

CROSS-REFERENCE TO RELATED APPLICATIONS

This application is a continuation of International Patent Application Number PCT/EP2010/058468, filed on Jun. 16, 2010, which was published in German as WO 2010/140685. The foregoing international application is incorporated by reference herein.

BACKGROUND

The invention relates to an airbag module for a vehicle occupant restraint system.

In case of the interior design of motor vehicles it is increasingly desired to provide a high degree of individualization by individual design and colouring.

The document DE 101 64 210 A1 describes an interior lining in a vehicle which covers an exit area of an airbag. It is provided in an embodiment that the exit area is located in a decorative insert of the interior lining. The document DE 200 16 493 U1 discloses a lining element for the interior lining of a passenger motor vehicle, which consists of an elongated rigid supporting plate, which is curved concave towards the passenger compartment and is provided with a decorative cover. A tear seam for providing an aperture opening for an airbag extends thereby over the visible surface of the supporting plate and the decorative cover.

The passenger motor vehicle model Fiat 500 (model year 2007/2008) of the automotive manufacturer Fiat S.p.A. implements an airbag module with a visible surface, which is formed by two parts with different surfaces, wherein the one part is formed centrical and separates completely from the surrounding frame part by disengaging when triggered. It is being retained to the module by a strap in the disengaged status.

SUMMARY

There is a need in the art to provide an airbag module for a vehicle occupant restraint system which allows for improved design possibilities.

The invention relates to an airbag module for a vehicle occupant restraint system, which comprises an airbag, a gas generator and a gas generator support and a visible surface facing the vehicle interior in the installed state, wherein said surface is formed by different segments of the airbag module, wherein at least two of the segments comprise optically and/or haptically different surfaces. It is provided that at least two of the segments are mechanically connected to each other via mechanical interfaces such that the mechanical connection between the segments is at least partially released by opening the interfaces when triggered so that an opening is formed in the visible surface through which the airbag can exit the airbag module. All segments, which contribute to the formation of an opening for the airbag by opening an interface when triggered, are thereby directly mounted to the gas generator support.

The solution according to the invention provides therefore that at least two of the segments forming the visible surface are connected to each other via detachable mechanical interfaces, which open when triggered and allow therefore the formation of an opening for the airbag in the visible surface. The mechanical interfaces provide therefore defined tearing lines and fulfil a double function by providing a mechanical connection between the segments and by defining furthermore tearing lines when triggered. The connecting areas of the single segments form therefore the tearing lines of the visible surface in case of unfolding of the airbag. The distribution of the visible surface corresponds therefore to the opening processes for the deployment of the airbag. This is in particular effective since no separate structuring of the segments outside of the connecting area is required.

The solution according to the invention provides furthermore that the singular segments, which contribute to the formation of an opening for the airbag by opening an interface when triggered, are directly mounted to the gas generator support and ensure therefore that the opening segments remain at the gas generator and cannot endanger an occupant to be protected. This is facilitated in a simple manner without the requirement of additional mounting elements.

The solution according to the invention allows simultaneously the realization of optically and/or haptically different surfaces and therefore a different styling of different segments, which form the visible surface of the airbag module. The visible surface can be divided in different styling segments. The singular segments can undergo a surface finishing independent of the other segments so that a surface finishing of one of the segments does not lead to additional costs in case of other non-furnished segments. Thereby, it can be freely chosen which of the different segments, which form the visible surface of the airbag module, shall undergo a surface finishing or a specific styling. Therefore it is in particular possible to provide selectively defined segments in dependency on the customer wish with a specific surface.

Two surfaces differ optically within the meaning of the present invention if they have a different colour and/or different light reflection properties, for instance different gloss values or mat values. Two surfaces differ haptically within the meaning of the present invention if they consist of different materials and/or comprise different surface structures. An optically and/or haptically different design of a surface is also known as surface finishing. The different surface finishing is accompanied by a different styling of the considered segment.

In an exemplary embodiment of the invention it is provided that at least two mechanical interfaces open up completely when triggered so that at least two of the segments forming the visible area are completely separated from each other after the exit of the airbag except for their mounting to the gas generator support. Through this, it is guaranteed that the segments in question cannot interfere with the exit of the airbag from the airbag module. It also can be provided alternatively that the interfaces open only partially so that the corresponding segments remain partly connected.

In a further exemplary embodiment it is provided that the mechanical interfaces of the segments are formed by corresponding form fit elements, which disengage and unlatch at a certain force, as it occurs during deployment of an airbag when triggered. The interfaces can however also be formed detachably in a different manner, for instance by using an adhesive which detaches at a certain force.

It can be furthermore provided that the visible surface comprises at least one segment which is connected to one of the other segments via a non-detachable mechanical interface. Such a segment does not participate in providing an opening for the airbag when triggered. When using such a further segment the design freedom can be further increased.

For directly mounting a segment to the gas generator support said segment can form mounting surfaces corresponding to each other. These can comprise additional positioning elements for instance in the way of protrusions and corresponding recesses which allow a prepositioning of the respective mounting surfaces.

The different segments of the airbag module forming the visible surface are formed in a variant by a cover cap, which when triggered opens at least partially and/or tears open, and/or is formed by visible areas of a module housing of the airbag module. The visible surface is for instance formed by different segments of a modular cover cap of the airbag module.

It is provided in an exemplary embodiment that the visible surface is formed by at least three segments of the cover cap, namely an upper cap segment, a lower cap segment and a central cap segment. A first non-detachable interface is provided for connecting the central cap segment to the upper or the lower cap segment and a second, detachable interface is provided for connecting the upper cap segment to the lower cap segment. The upper and the lower cap segment are thereby connected at their end to the gas generator support facing away from the central cap segment. It can be furthermore provided that the central cap segment is connected via a decorative ring as a further cap segment to the upper or the lower cap segment.

In a further exemplary embodiment of the invention it is provided that for implementing an optically and/or haptically different surface the surface of a segment is formed by a plastic film. Hereby, different film designs can be applied without that the support material has to be changed. Such a surface finishing is obtained for instance by injecting a pre-decorated film with a material suitable for injection moulding. Hereby, for instance smooth high glossy surfaces can be produced on soft airbag substrates. However, also other methods as for instance adhesion, hot stamping, dip printing etc. are possible for applying a finished surface as an alternative.

The injection of a surface material can occur instead on the basis of a plastic film also with other supports or laminates. A fabric or a leather cutting can be for instance injected. In each case, the injection of a surface material has the advantage that the flexibility of the injected area remains intact. This is in particular of an advantage if the segment provided with a surface finishing is located in the area of the exit surface of the airbag of the airbag module.

In case of injecting a segment with a plastic film, the plastic film presents the surface of a looked at segment facing the vehicle occupant. It can thereby be provided for using specific film types having a high scratch resistance as styling surfaces. This is in particular of an advantage in case of high glossy and smooth surfaces.

The singular segments are connected to each other only after having applied a surface finishing to at least one of the segments. This has the advantage that the transition between the different segments is clearly distinguishable from each other due to connecting the singular segments only after having applied a surface finishing. The singular segments are therefore definite and clearly distinguishable from each other.

A surface finishing in form of a film or such can have furthermore the advantage that the surface finishing covers the mechanical interfaces or the mechanical connection between two segments provided by said interfaces.

It is pointed out that the optically and/or haptically different surfaces of the segments, which form the visible surface of the airbag module, can be provided with further components, for instance with badges or decorative elements. These are for instance adhered to a segment provided with the surface finishing. The connection can occur for instance by thermal welding, gluing, snapping etc. By providing such badges or decorative elements on conventionally formed visible surfaces, however, no optically and/or haptically different surfaces are provided within the meaning of the present invention, since such badges and decorative elements do form on the hand not directly the surface of the looked at segment and on the other hand cover only partial areas of the visible surface of a segment.

BRIEF DESCRIPTION OF THE DRAWINGS

The invention is explained in the following by referring to the Figures of the Drawings by the means of multiple embodiments.

FIG. 9 shows examples for possible variations of the embodiment of the central segments of the modular cap of FIG. 1.

DETAILED DESCRIPTION

Figure 1:
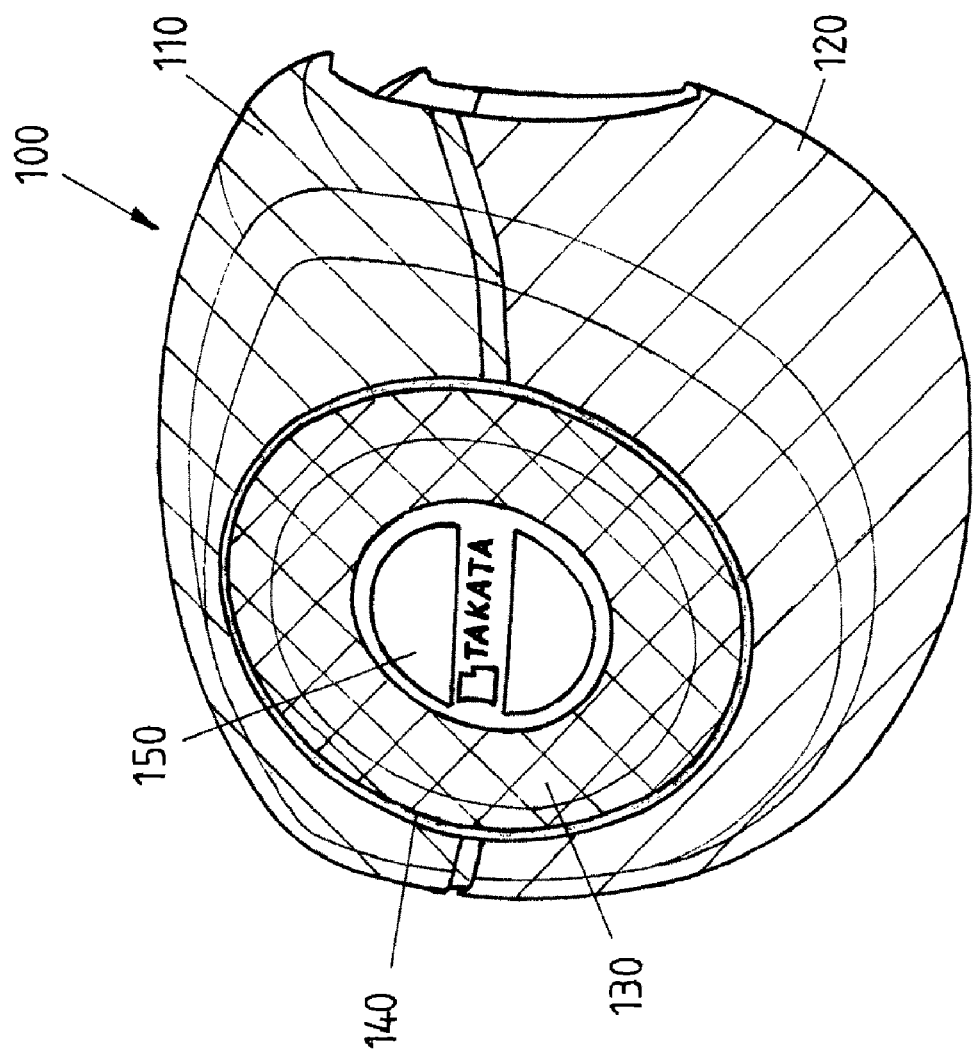
FIG. 1 shows a perspective illustration of a visible area of an airbag module formed by a modular cap according to an embodiment of the invention, wherein the modular cap has an upper segment, a lower segment and a central segment.

FIG. 1 shows in a perspective illustration an embodiment of a visible area of an airbag module. The visible area forms the central part of a steering wheel in which the airbag module is assembled. The visible area is formed by a modular cover cap 100 (designated also as cap in the following), which comprises tearing lines, which lead to a tearing of the cap when triggered.

The cap 100 has multiple segments in the illustrated embodiment, for which independent from each other a colour and/or surface selection can be made. Thus, the modular cap 100 comprises an upper segment 110 (also designated as "cap segment 12 o'clock"), a lower cap segment 120 (also designated as "cap segment 6 o'clock"), a central cap segment 130 (also designated as "central disc") and an optional decorative ring 140. A badge 150 is additionally provided, which is applied centrally to the central segment 130 for instance by welding, gluing or snapping.

The cap segments 110, 120, 130, 140 are produced separately, optionally provided with different colours, glossy values and/or surface materials, and are subsequently connected with each other via connecting interfaces.

Figure 2:
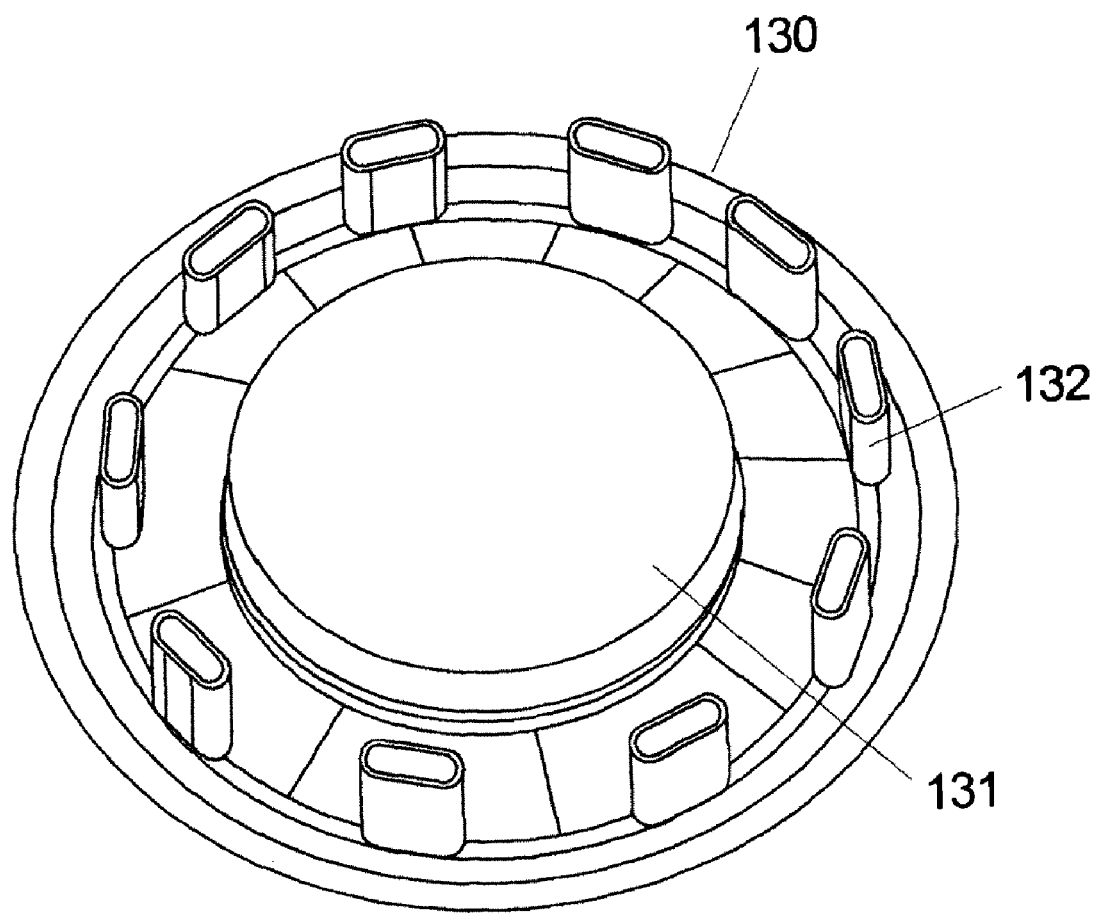
FIG. 2 shows in a perspective illustration the side of the central segment of FIG. 1 facing away from the visible area.

FIG. 2 shows the internal side of the central segment 130 facing away from the visible surface. A central, even area 131 can be identified, which serves for receiving the badge 150. The central segment 130 is formed as a circle and comprises also in a circular arrangement adjacent to its circumference a multitude of connecting elements 132, which project from the central disc 110 and are formed for instance as welding domes.

Figure 3:
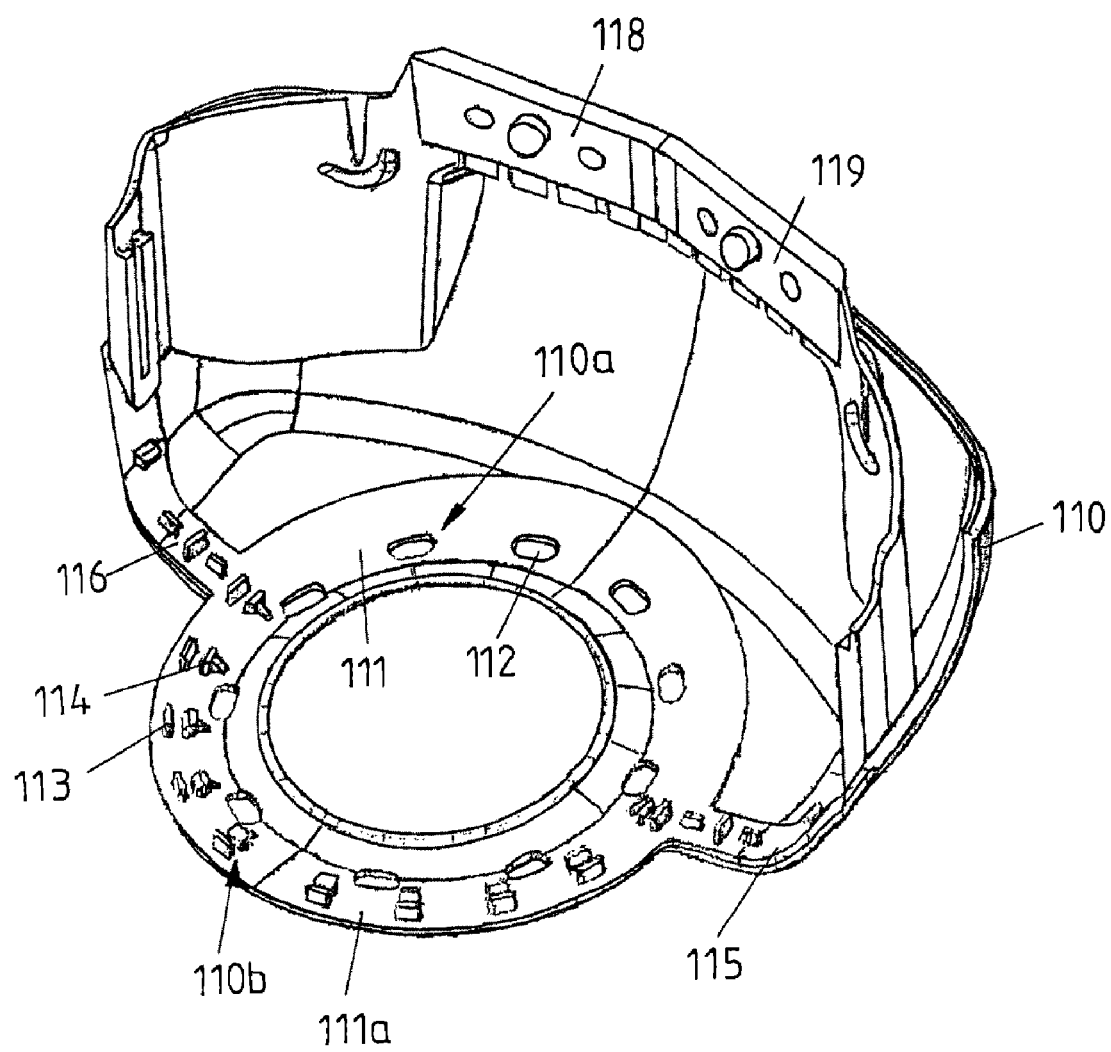
FIG. 3 shows in a perspective illustration the side of the upper segment of FIG. 2 facing away from the visible area.

FIG. 3 shows the internal side of the upper segment 110 facing away from the visible area. The upper segment 110 forms an interface 110a for connecting the upper segment 110 to the central segment 130 as well as a surface 110b for connecting the upper segment 110 to the lower segment 120. The interface 110a for connecting to the central segment 130 is formed by a circular, even formed area 111, which comprises a multitude of recesses 112, which correspond to the welding domes 132 of the central segment 130. The fixation occurs by the means of ultrasound welding so that a mechanical irreversible connection is present, which cannot unlatch.

The upper segment 110 comprises furthermore as a second interface 110b for connecting to the lower segment 120 along a semi circle 111a of the circular area 111 a plurality of form fit elements in form of projections 113 and latching elements 114, which correspond to the appropriate recesses and edges of the lower segment 120 as being explained below by the means of the FIGS. 4 to 6. The projections 113 and latching elements 114 extend thereby additionally and along to edge sections 115, 116 of the upper segment 110.

In difference to the interface 110a for connecting the upper segment 110, the interface 110b for connecting to the lower segment 112 is formed detachably in the sense that the mechanical connection provided by the interface 110a can be released by applying a force, wherein form fit elements forming the mechanical connection are unlatched. The interface 110a forms therefore together with the appropriate interface of the lower segment 120 a tearing line along which the cap can be teared open when triggered.

The upper cap segment 110 comprises furthermore two mounting surfaces 118, 119 which serve for connecting to a generator support of the airbag module as explained later by the means of FIG. 7.

By the means of the FIG. it is recognized that the cap 100 and its singular segments 110 to 140 can be formed curve-like and can comprise areas which extend away from the vehicle occupant. For instance the upper segment 110 and the lower segment 120 extend according to FIG. 1 away from the vehicle occupant starting from an area facing the vehicle occupant, which forms the central segment 130.

Figure 4:
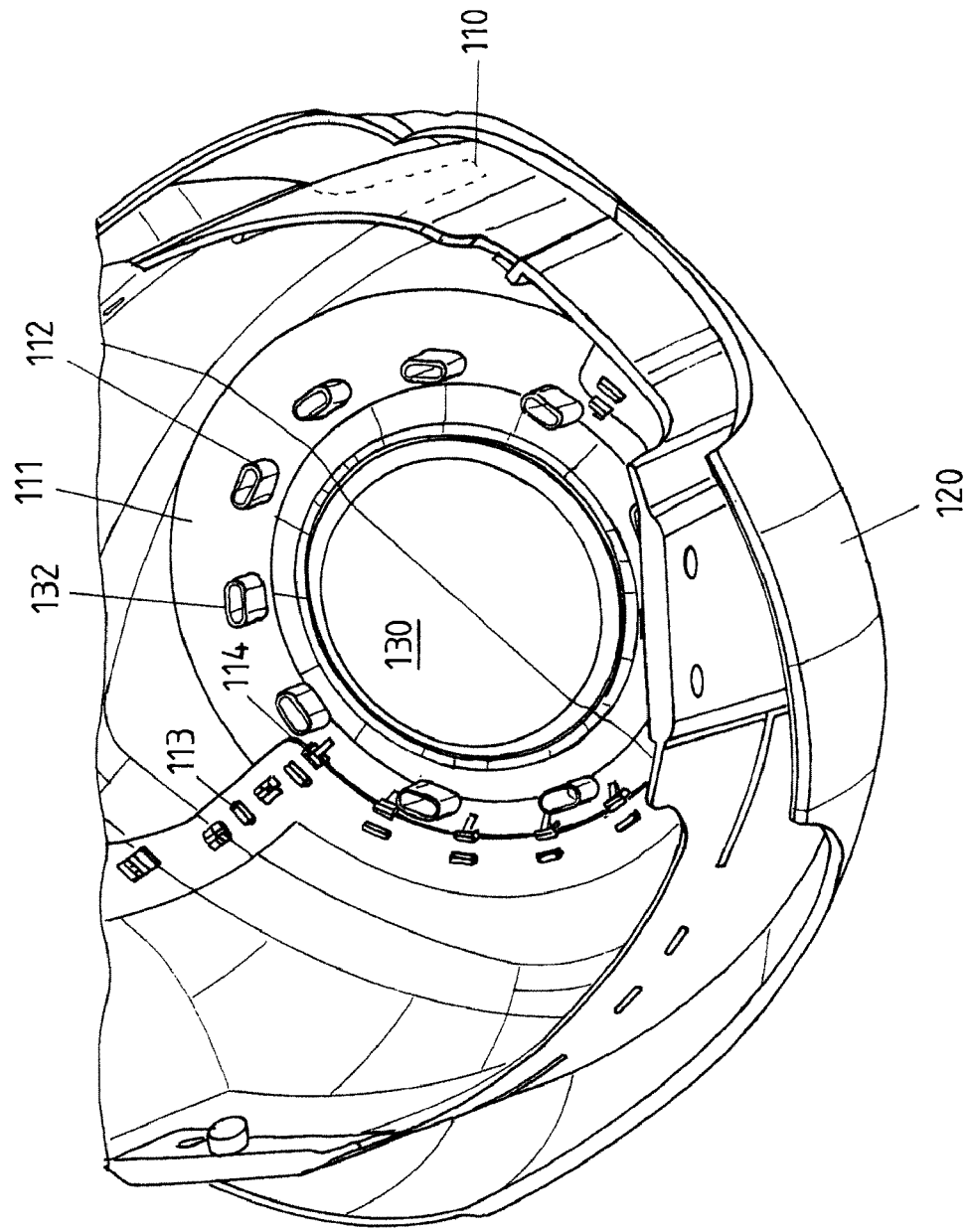
FIG. 4 shows in a perspective illustration the connection of the upper, lower and central segments of the modular cap of FIG. 1.

FIG. 4 shows the upper segment 110, the lower segment 120 and the central segment 130 in a mounted status, however, still before an ultrasound welding of the welding domes 132. It is recognizable that the welding domes 132 protrude through the recesses 112 in the circular area 111 of the upper segment 110. A tight, non-detachable connection is present after an ultrasound welding. The upper segment 110 is furthermore connected via the projections 113 and latching elements 114 to the lower segment 120, wherein this connection is cancelled out by the occurrence of a force over the entire length of the interface 110b or a partial length when triggered, i.e. the segments 110, 120 separate partially or completely by exit of the airbag. The central segment 130 connected non-detachable to the upper segment 110 remains on the other hand connected to the upper segment 110 also after the exit of the airbag.

Therefore, a connection of upper segment 110, lower segment 120 and central segment 130 can occur after applying a surface finishing on one or more or all of the segments 110 to 130 via the two interfaces 110a, 110b.

Figure 5:
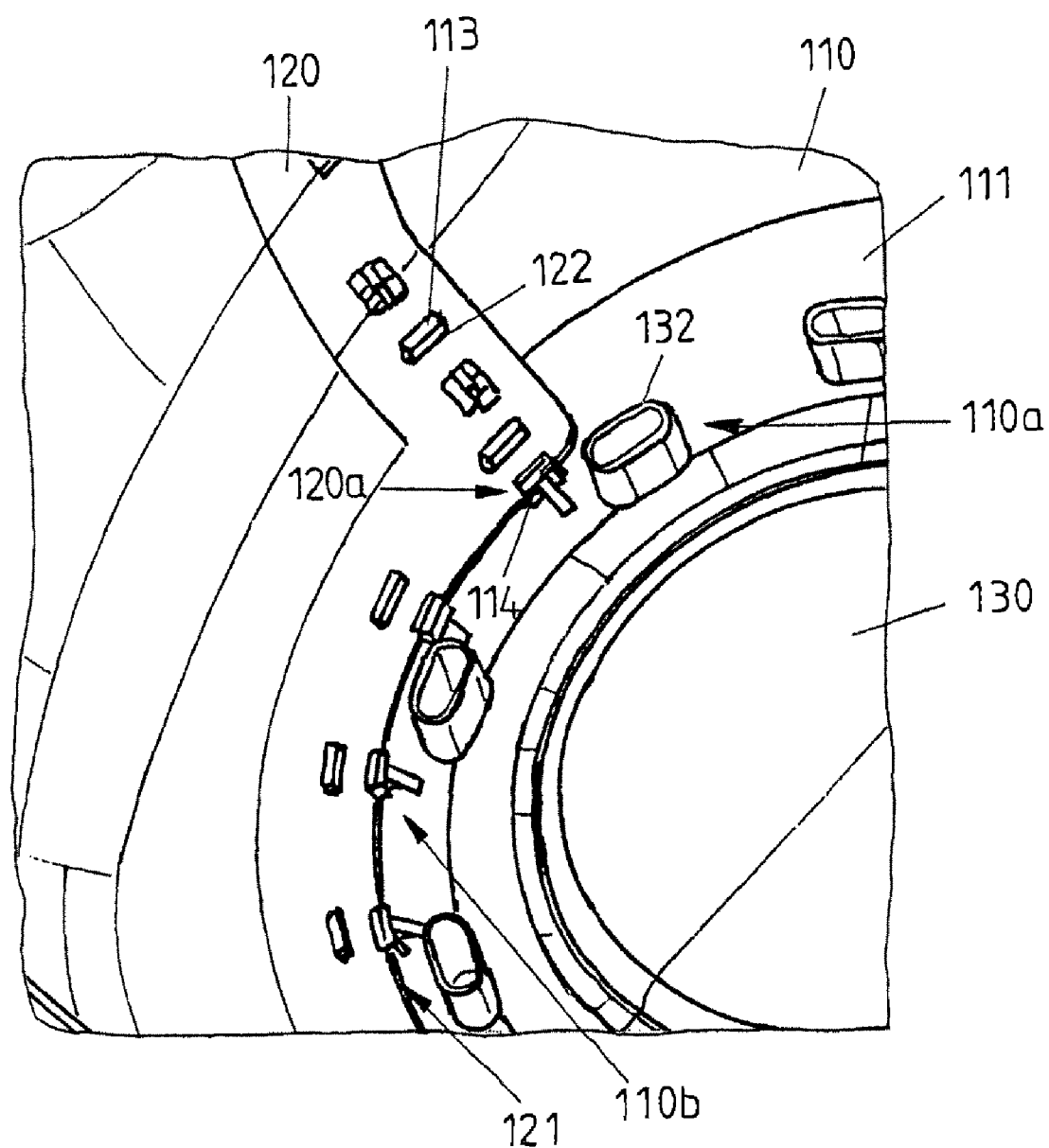
FIG. 5 shows an enlarged illustration of the connecting areas of FIG. 3.

FIG. 5 shows an enlarged illustration of the two interfaces 110a, 110b of the upper segment 110 as well as an interface 120a of the lower segment 120. Thereby it is recognized that the latching elements 114 project above an edge 121 of the lower segment 120 in a latching manner and provide together with the projections 113, which project into recesses 122 of the lower segment 120, a form fit connection. The edge 121 and the recesses 122 of the lower segment 120 form thereby the mechanical interface 120a of the lower segment 120, which form together with the interface 110 of the upper segment 110 a detachable, namely latch able mechanical connection between the two segments 110, 120. The interface 110b, 120a and the mechanical connection formed by them are formed such that an opening of the mechanical connection occurs by forces which affect the cap 100 during the unfolding of an airbag.

Figure 6:
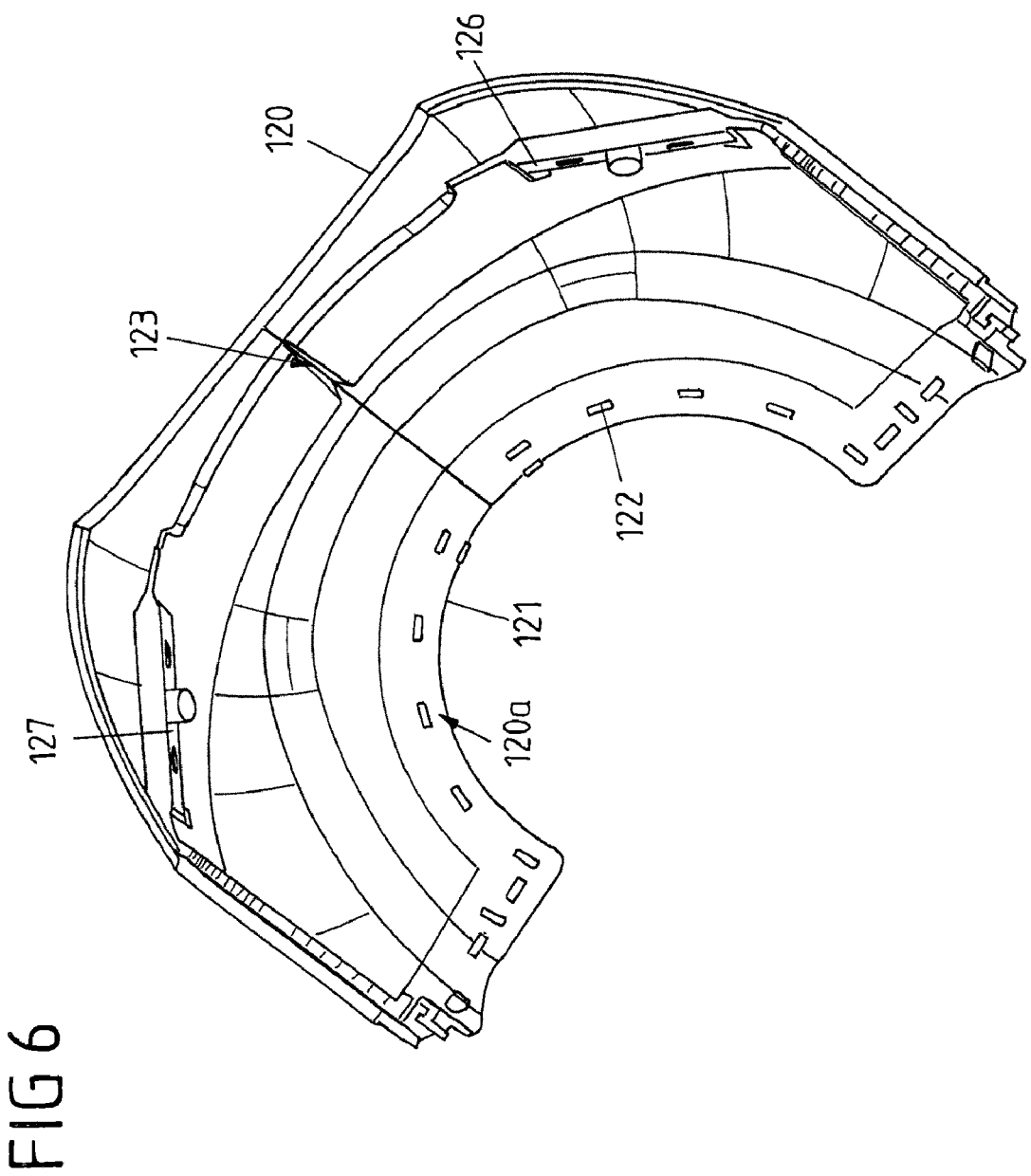
FIG. 6 shows in a perspective illustration the side of the central segment of FIG. 1 facing away from the visible area, wherein a tearing line is integrated into the segment.

FIG. 6 shows the lower segment 120 without further segment parts. The semi-circular edge 121 and the recesses 122 as well as the mechanical interface 120a formed by them are recognizable. An additional conventional tearing line 123 can be optionally provided in the lower segment 120.

The lower segment 120 comprises furthermore two mounting surfaces 126, 127, which serve the connection to a generator support of the airbag module, as will be explained by FIG. 7.

Therefore, a modular-built cap 100 is provided, which comprises a multitude of segments 110, 120, 130, 140, which can be produced separately and can be separately provided with the surface finishing.

The surface finishing can thereby occur for instance by the means of a plastic film. The connection of the plastic film to a segment occurs before the segment is being connected to other segments. The connection can for instance occur by gluing, hot stamping, etc. In an embodiment the plastic film is injected by the formation of a common unit of plastic film and segment with an injecting moulding plastic, which forms then the main body of the segment. The segment comprises due to the plastic film for instance a smooth, high glossy surface. In dependency on the type and modification of the plastic film different colours, glossy values, surface structures and decorations can be realized. In an embodiment the form comprises thereby a high scratch resistance. The segment in question forms a styling portion of the visible area due to the surface finishing.

It is being pointed out that the transition between a segment provided with a plastic film to an adjacent segment is clearly distinguished due to the previous application of the plastic film. This increases the clarity and elegance of the design.

It is furthermore pointed out that a plastic film as a surface finishing can additionally cover the mechanical interfaces or the connecting area between the singular segments. An aesthetically disadvantageous optical recognisability of the connecting area is thereby prevented.

Further examples for a surface finishing are a varnish, a specific colour, providing of different materials as plastic, fabric and leather and/or providing different mattings or gloss values. In an embodiment thereby again a surface material, as for instance a plastic film, a fabric or a leather cutting is in injected with a plastic.

The provided interfaces for connecting the singular segments of the cap 100 can be used in a variable manner. It can be provided for instance that the interface formed on the upper segment 110 is used instead for connecting to the central segment 130 for mounting the decorative ring 140 shown in FIG. 1. The decorative ring 140 is thereby connected by the means of appropriate welding domes to the upper segment 110 according to the previous description. The central segment 130 is connected in this case only to the decorative ring 140, is for instance glued to said ring. The central segment 130 has thereby a smaller diameter in contrast to the embodiment in which no decorative ring 140 is provided FIG. 7 shows an airbag module in explosive illustration. Beside the previously described cap 100, which comprises the central cap segment 130, the decorative ring 140, the upper cap segment 110 and the lower cap segment 120, furthermore a diffuser 200, a generator support 300 and a gas generator 400 are illustrated.

The generator support 300 serves for mounting and mechanically connecting the parts of the airbag module. Said support is tightly connected to the vehicle structure. The diffuser 200 comprises on the lower side of a revolving lower flange 211 elongated projections 215 which project through the openings 315 in the generator support 300 in the assembled status, which further project through the openings 415 in a flange 411 of the gas generator 400 and which are screwed together by the means of screw nuts 410. Through this the diffuser 200, the generator support 300 and the gas generator 400 are tightly connected to each other.

Figure 7:
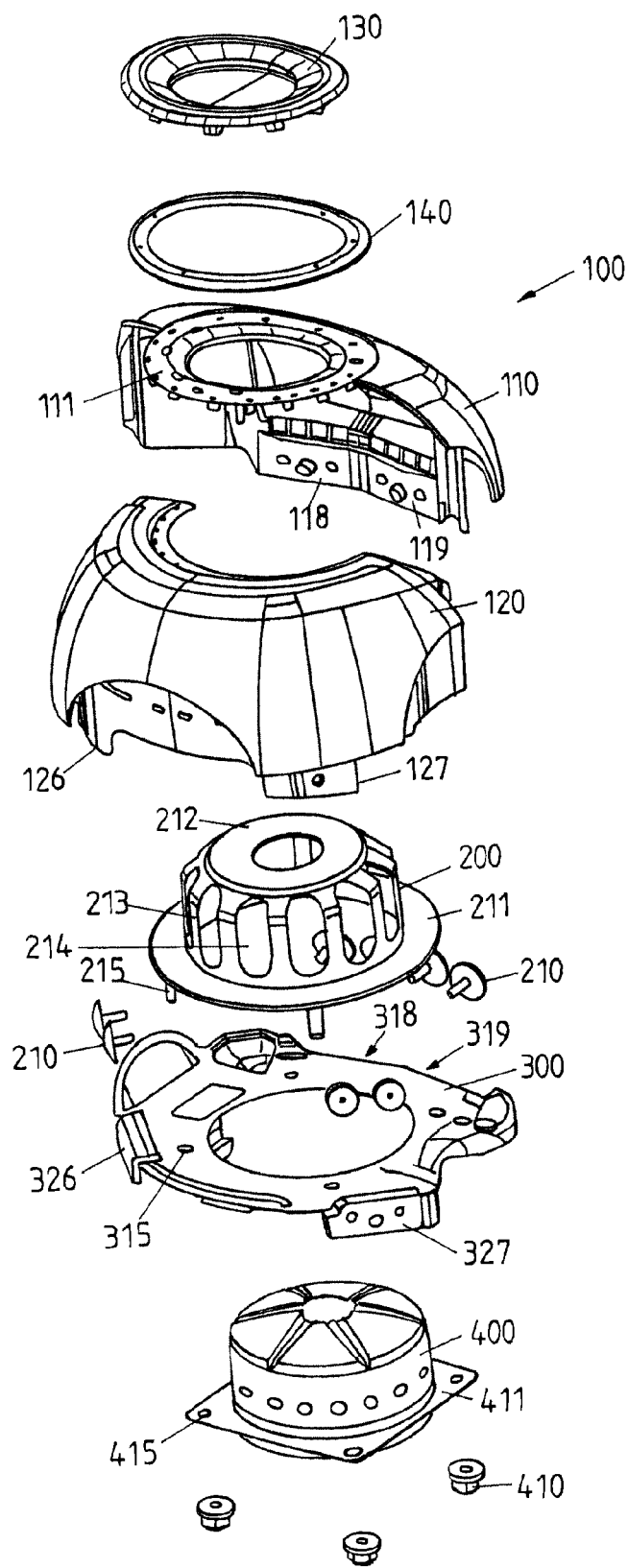
FIG. 7 shows an explosive illustration of an embodiment of an airbag module with a cap according to FIG. 1.

In FIG. 7 it is furthermore recognizable that the diffuser 200 is formed starting from the revolving lower flange 211 essentially cup-shaped with a cover area 212 and lateral rods 213 with spaces 214 there between.

The generator support 300 comprises furthermore lateral receiving surfaces 326, 327 which serve the connection to the mounting surfaces 126, 127 of the lower cap segment 120 (compare also FIG. 6). Likewise receiving surfaces 318, 119 are formed on the generator support 300, which serve the connection to the mounting surfaces 118, 119 of the upper cap segment 110 (compare also FIG. 3). The mounting occurs for instance via corresponding form fit elements and/or riveting or screwing. Rivets 210 are illustrated exemplarily for this in FIG. 7.

The upper cap segment 110 as well as the lower segment 120 is mounted therefore on their area facing away from the central cap segment 130 tightly and non-detachable mounted directly to the generator support 300.

In case of an unfolding of the airbag, which is not shown in FIG. 7 and is located between the diffuser 200 and the cap 100, the detachably formed connection between the upper segment 110 and the lower segment 120, which is formed by the interfaces 110b, 120a, is teared open. The interfaces 110b, 120a provide a predetermined breaking point or tearing lines of the cap 100, which open during opening of the cap 100 when triggered, in so far that the unfolding airbag can exit the module. The two caps 110, 120 are thereby in partial areas or completely separated. In latter case the cap segments 110, 120 are completely separated from each other. They are however still connected to the generator support 300 so that they pose no danger for the person to be protected and do also not have to be retained by separate means as for instance tethers to the generator support 300.

The opening of the cap 100 is therefore achieved by the partial or complete unlatching of the interfaces 110, 120a off the upper segment 110 and the lower segment 120. As already explained, the central cap segment 130 remains at least in a modification at the upper cap segment 110, since the mechanical connection between these segments is non-detachable. Through this, it is in turn prevented that the central segment 110 can jeopardize a vehicle occupant to be protected. The same is valid for the decorative ring 140, which is also non-detachable together with the central cap segment 130 connected to the upper sap segment 110.

Figure 8:
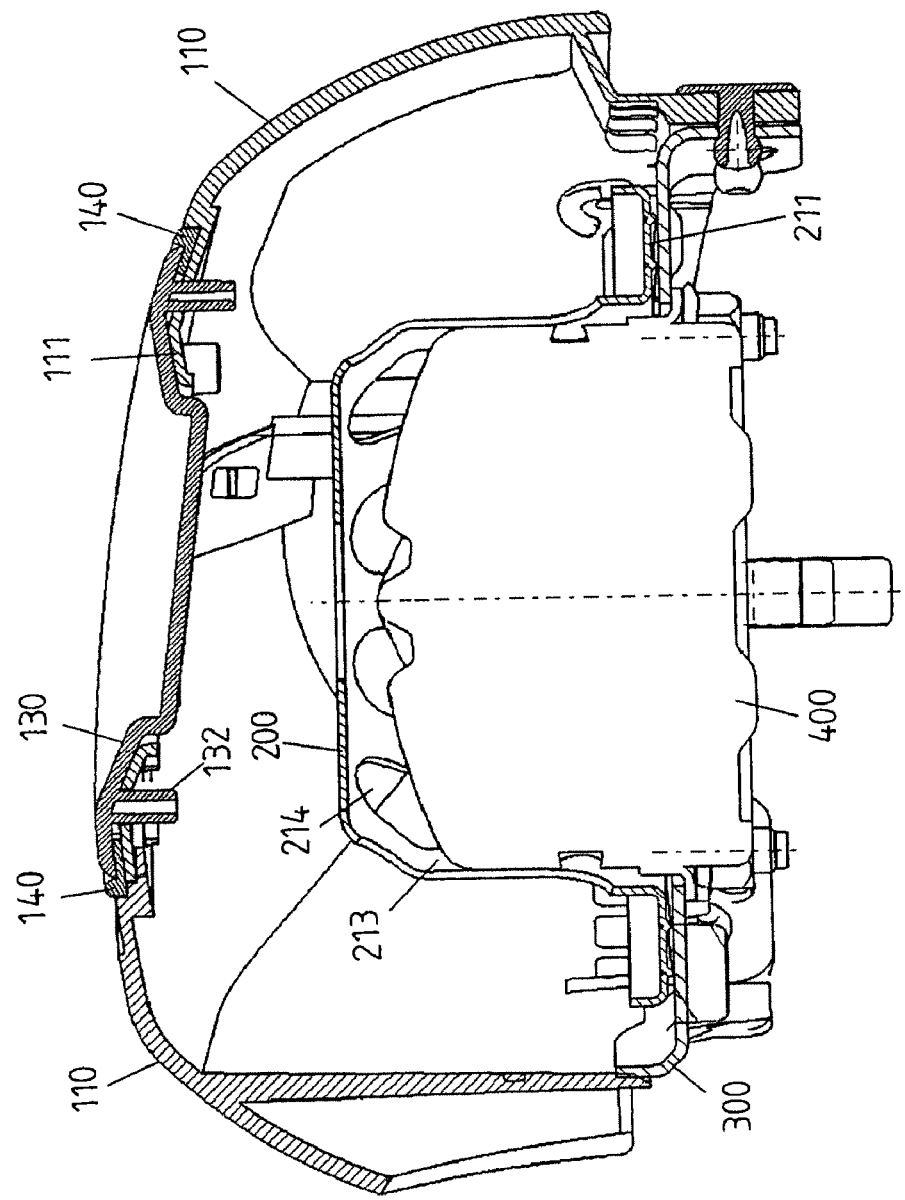
FIG. 8 shows a cross section of the airbag module of FIG. 7.

FIG. 8 shows the airbag module in a partial cross sectional illustration. The section continues thereby in the area of the upper cap segment 110.

In the cross sectional illustration of FIG. 8 the central cap segment 130, the decorative ring 140 as well as their connection to the circular area 111 of the upper cap segment 110 via the connecting elements 132 is illustrated. Furthermore, the diffuser 200, the generator support 300 and the gas generator 400 are recognizable. The airbag is located in the area between the diffuser 200 and the cap 100, wherein the airbag is typically clamped between the flange 211 of the diffuser 200 and the generator support 300.

FIG. 9 shows in the upper row a steering wheel with a steering wheel rim 160, steering wheel spokes 170 and steering wheel hub, in which area the airbag module is arranged and is covered by the modular cap 100 which forms the visibla surface of the module. In the left illustration none of the segments of the cap 100 is provided with a surface finishing. In the central illustration a central segment 130 is surface-finished. In the right illustration a central segment 130' being surface-finished as well as a decorative ring 140 are provided. Said ring is recognizable in the lower row of FIG. 9 in the right perspective cross-sectional illustration. The central segment 130' comprises thereby a smaller diameter than implemented without decorative ring 140 which is illustrated left in the lower row of FIG. 9.

Therefore, the one interface 110a of the upper segment 110 can be connected to different other segments 130, 140, which in each case comprise corresponding interface elements. This increases the design variety without additional cost during production of the upper segment 110. Such multiple combinable interfaces can also be realized with other interfaces. Then a module assembly set is provided with a multitude of segments with defined interfaces, based on which different forms and sizes of the cover cap 100 and/or of a module housing area can be assembled.

The invention is not restricted in its embodiment to one of the previously illustrated examples, which only have to be understood as being exemplary. For instance the visible face can be formed by segments formed in different ways or the connection of the singular segments can occur in a different manner than described. It is furthermore being pointed out that the present invention is explained by the means of a driver airbag module, however the invention can also be realized with other airbag modules with a visible surface, in particular a passenger airbag module or a knee airbag module.

The priority application, German Patent Application Number 10 2009 030 151.8, filed on Jun. 19, 2009 is incorporated by reference herein.

The invention claimed is:

1. An airbag module for a vehicle occupant restraint system comprising:
   an airbag;
   a gas generator;
   a gas generator support, and
   a visible surface facing a vehicle interior in an installed state, said visible surface being formed by different segments,
   wherein at least one of the different segments has an optically and/or haptically different surface from another of the different segments,
   wherein at least two of the different segments are mechanically connected to each other by mechanical interfaces such that the mechanical connection between the at least two of the different segments is at least partially released by opening the mechanical interfaces in case of activation of the airbag module so that an opening is formed in the visible surface through which the airbag can exit,
   wherein all of the different segments contributing to the formation of the opening for the airbag by opening the mechanical interfaces are directly fastened to the gas generator support, and
   wherein the mechanical interfaces are formed by corresponding form fit elements which are configured to disengage upon a certain force.

2. The airbag module according to claim 1, wherein at least two of the mechanical interfaces open completely when triggered so that the at least two of the different segments are completely separated from each other after the exit of the airbag except for fixations of the at least two of the different segments to the gas generator support.

3. The airbag module according to claim 1, wherein the different segments have an interface between two interfaced segments, and wherein the two interfaced segments remain in contact at the interface during airbag deployment.

4. The airbag module according to claim 1, wherein, for direct mounting of one of the different segments to the gas generator support, said one of the different segments and said gas generator support form mounting surfaces corresponding to each other.

5. The airbag module according to claim 1, wherein the different segments comprise first segments formed by a cover cap, which when triggered opens at least partially and/or tears open, and/or are formed by visible areas of a module housing of the airbag module.

6. The airbag module according to claim 5, wherein the different segments are also formed by second segments different from the first segments of the cover cap of the airbag module.

7. The airbag module according to claim 1, wherein the different segments forming the visible surface comprise at least three segments of a cover cap, and wherein the at least three segments of the cover cap comprise an upper cap segment, a lower cap segment and a central cap segment.

8. The airbag module according to claim 7, wherein a first interface for connecting the central cap segment to the upper cap segment or the lower cap segment is provided such that the central cap segment and the upper or lower cap segment at the first interface remain in contact during airbag deployment, and a second interface for connecting the upper cap segment to the lower cap segment is provided such that the upper cap segment and the lower cap segment at the second interface are physically separated from one another during airbag deployment.

9. The airbag module according to claim 7, wherein the central cap segment is connected via a decorative ring to the upper cap segment or to the lower cap segment.

10. The airbag module according to claim 7, wherein the central cap segment is formed circular.

11. The airbag module according to claim 1, wherein at least one of the different segments comprises a basic material and a surface material arranged completely on the basic material.

12. The airbag module according to claim 1, wherein at least one of the different segments comprises a surface material which is injected with an injection moulding material as a basic material.

13. The airbag module according to claim 1, wherein the visible surface is formed from a surface material, and wherein the surface material is a plastic film, a fabric or a leather cutting.

14. The airbag module according to claim 1, wherein the at least two of the segments that have optically and/or haptically different surfaces have surfaces, which differ from each other in that each of the at least two of the segments that have optically and/or haptically different surfaces comprises a different surface material and/or a different varnish.

15. The airbag module according to claim 1, wherein the surface of the at least one of the different segments is optically and/or haptically different from the surface of the another of the different segments at the visible surface along an entire boundary line between the at least one and the another of the different segments.

16. An airbag module for a vehicle occupant restraint system comprising:
an airbag;
a gas generator;
a gas generator support, and
a visible surface facing a vehicle interior in an installed state, said visible surface being formed by different segments,
wherein at least one of the different segments has an optically and/or haptically different surface from another of the different segments,
wherein the surfaces of at least two of said segments differ optically and/or haptically from each other over their complete visible areas,
wherein at least two of the different segments are mechanically connected to each other by mechanical interfaces such that the mechanical connection between the at least two of the different segments is at least partially released by opening the mechanical interfaces in case of activation of the airbag module so that an opening is formed in the visible surface through which the airbag can exit,
wherein all of the different segments contributing to the formation of the opening for the airbag by opening the mechanical interfaces are directly fastened to the gas generator support, and
wherein the mechanical interfaces are formed by corresponding form fit elements which are configured to disengage upon a certain force.

17. An airbag module for a vehicle occupant restraint system comprising:
an airbag;
a gas generator;
a gas generator support, and
a visible surface facing a vehicle interior in an installed state, said visible surface being formed by different segments,
wherein at least one of the different segments has an optically and/or haptically different surface from another of the different segments,
wherein at least two of the different segments are mechanically connected to each other by mechanical interfaces such that the mechanical connection between the at least two of the different segments is at least partially released by opening the mechanical interfaces in case of activation of the airbag module so that an opening is formed in the visible surface through which the airbag can exit,
wherein all of the different segments contributing to the formation of the opening for the airbag by opening the mechanical interfaces are directly fastened to the gas generator support, and
wherein the mechanical interfaces are formed by corresponding form fit elements which are configured to disengage upon a certain force.
wherein said form fit elements comprise a plurality of projections and latches on at least one of the at least two of the different segments that engage with respective recesses and edges on another of the at least two of the different segments.

* * * * *